(12) United States Patent
Si

(10) Patent No.: US 12,468,757 B2
(45) Date of Patent: Nov. 11, 2025

(54) GROUP-SPECIFIC MODEL GENERATION SYSTEM, SERVER, AND NON-TRANSITORY COMPUTER-READABLE RECORDING MEDIUM FOR RECORDING GROUP-SPECIFIC MODEL GENERATION PROGRAM

(71) Applicant: AWL, Inc., Tokyo (JP)

(72) Inventor: Xiaotian Si, Tokyo (JP)

(73) Assignee: AWL, Inc., Tokyo (JP)

( * ) Notice: Subject to any disclaimer, the term of this patent is extended or adjusted under 35 U.S.C. 154(b) by 407 days.

(21) Appl. No.: 18/050,025

(22) Filed: Oct. 26, 2022

(65) Prior Publication Data

US 2023/0128717 A1 Apr. 27, 2023

(30) Foreign Application Priority Data

Oct. 27, 2021 (JP) .................................. 2021-175859

(51) Int. Cl.
*G06F 16/55* (2019.01)
*G06F 16/583* (2019.01)
*G06N 3/02* (2006.01)

(52) U.S. Cl.
CPC ............ *G06F 16/55* (2019.01); *G06F 16/583* (2019.01); *G06N 3/02* (2013.01)

(58) Field of Classification Search
CPC .......... G06F 16/55; G06F 16/583; G06N 3/02
See application file for complete search history.

(56) References Cited

FOREIGN PATENT DOCUMENTS

JP        6178942 B1     8/2017
WO     WO 2017/151759   *  8/2017   .............. G06N 3/04

* cited by examiner

*Primary Examiner* — David F Dunphy
(74) *Attorney, Agent, or Firm* — Oblon, McClelland, Maier & Neustadt, L.L.P.

(57) ABSTRACT

A group-specific model generation system includes: a captured image collection circuitry configured to collect a captured image from each of cameras; an image feature extraction circuitry configured to extract a feature from each of the captured images; an image clustering circuitry configured to group the captured image based on the feature of each of the captured images; a camera classification circuitry configured to classify cameras into groups, based on a result of the grouping of the captured images; and a group-specific model generation circuitry configured to generate a group-specific learned neural network model suitable for captured images taken by the cameras in the each of the groups.

9 Claims, 10 Drawing Sheets

FIG. 7
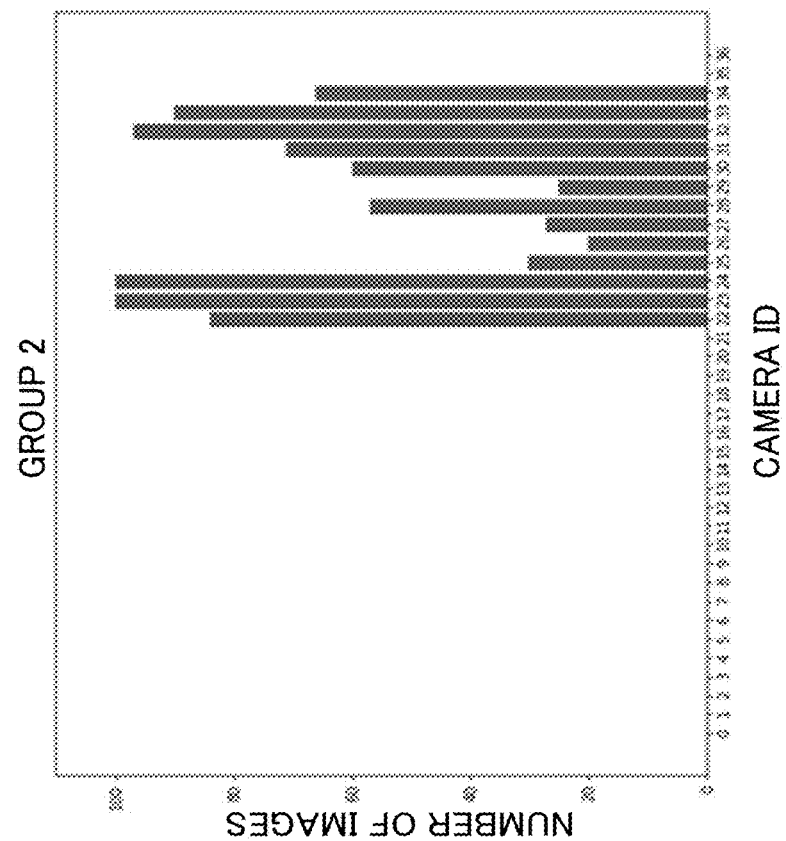
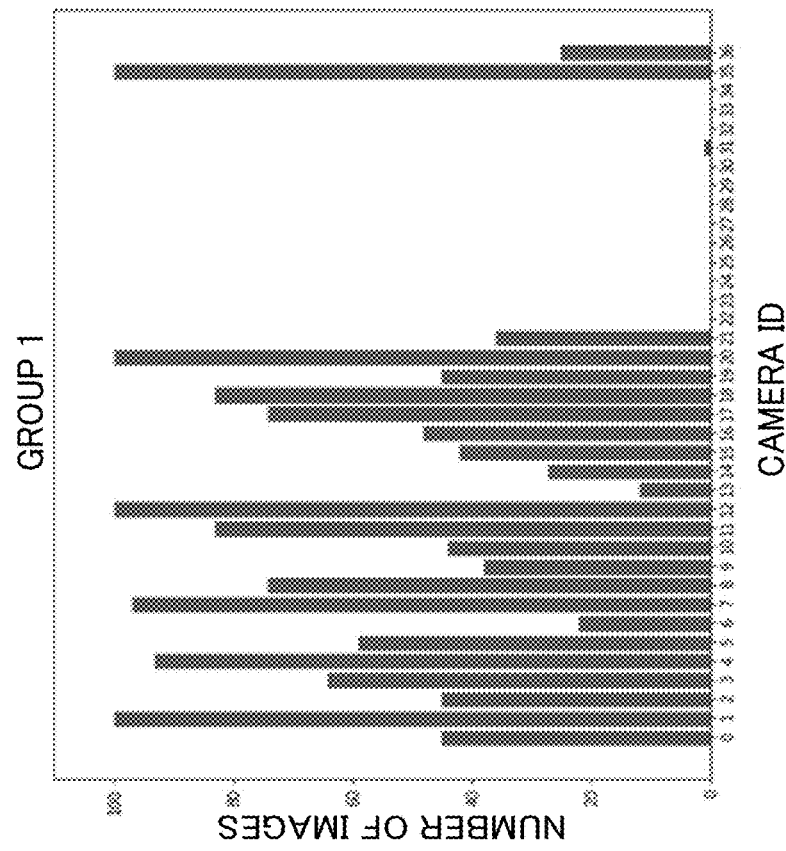

FIG. 10

|  | BEFORE FINE-TUNING | AFTER FINE-TUNING |
|---|---|---|
| PRECISION | 0.472222222 | 0.916666667 |
| RECALL | 0.437037037 | 0.935185185 |
| F1 VALUE | 0.453943865 | 0.925828334 |
| iou | 0.1 | 0.1 |
| pred_th | 0.9 | 0.9 |
| TP | 47 | 99 |
| FP | 3 | 5 |
| FN | 11 | 2 |
| TOTAL (NUMBER OF IMAGES) | 90 | 90 |

# GROUP-SPECIFIC MODEL GENERATION SYSTEM, SERVER, AND NON-TRANSITORY COMPUTER-READABLE RECORDING MEDIUM FOR RECORDING GROUP-SPECIFIC MODEL GENERATION PROGRAM

CROSS-REFERENCE TO RELATED APPLICATION

This application is based on and claims the benefit of priority of the prior Japanese Patent Application No. 2021-175859, filed on Oct. 27, 2021, the entire contents of which are incorporated herein by reference.

BACKGROUND OF THE INVENTION

1. Field of the Invention

The present invention relates to a group-specific model generation system, a server, and a non-transitory computer-readable recording medium for recording a group-specific model generation program.

2. Description of the Related Art

There is a conventionally known system in which image analysis (object detection and object recognition) is performed on a captured image taken by a camera installed in a facility such as a store, by an apparatus (so-called edge-side device) installed on a facility side where the camera is installed (see, for example, Japanese Patent No. 6178942). In a case where object detection and object recognition are performed in such an edge-side device, a learned deep neural network model (DNN model) whose processing load is small (so-called "light") is implemented on an edge-side device, and an object detection process and an object recognition process are performed, by using the learned DNN model, on a captured image taken by a camera connected to the edge-side device. Because computer resources of the edge-side device are insufficient, the learned DNN model implemented on the edge-side device is desirably an extremely light (imposing a very small processing load) DNN model.

BRIEF SUMMARY OF THE INVENTION

However, in a case where such an extremely light (imposing a very small processing load) learned DNN model as described above is implemented on edge-side devices disposed in a large number of facilities and an object detection process and an object recognition process are performed on captured images taken by cameras in the large number of facilities, there are problems as follows. First, in the case of an extremely light learned DNN model, it is difficult to perform a highly accurate object detection process and object recognition process.

In addition, in a case where such an extremely light learned DNN model as described above is used, it is desirable, in order to ensure accuracy, to perform, on each camera in the facilities, fine-tuning or transfer learning of an original learned DNN model by using captured images taken by the each camera. However, in a case of a major chain store (convenience store or the like), the number of stores is several thousands. Therefore, it takes an enormous amount of time to perform, on each of the cameras disposed in the several thousand stores, fine-tuning or transfer learning of a learned DNN model by using captured images taken by the each of the camera. Therefore, it is not realistic to perform fine-tuning or transfer learning of the learned DNN model for each camera in the facilities by using captured images taken by the each camera as described above. On the other hand, even if fine-tuning or transfer learning of an extremely light learned DNN model is performed using the captured images taken by all the cameras disposed in the several thousand stores, it is impossible in many cases to sufficiently learn the extremely light DNN model due to diversity (layouts, light conditions, presence or absence of people, interior decoration, and the like in the stores) of the captured images acquired (collected) from the cameras in the several thousand stores.

The present invention solves the above problems, and an object of the present invention is to provide a group-specific model generation system, a server, and a non-transitory computer-readable recording medium for recording a group-specific model generation program that enable a highly accurate object detection process and object recognition process even when captured images to be subjected to object detection processes and object recognition processes of entire edge-side apparatuses (edge-side devices) are captured images by cameras of a large number of facilities, for example, several thousand stores and even when a used learned neural network model is an extremely light learned neural network model.

In order to solve the above problems, a group-specific model generation system according to a first aspect of the present invention includes: a captured image collection circuitry configured to collect a captured image from each of cameras installed in a plurality of facilities; an image feature extraction circuitry configured to extract a feature from each of the captured images collected by the captured image collection circuitry; an image clustering circuitry configured to perform grouping of the captured images collected by the captured image collection circuitry, on a basis of the feature of each of the captured images, extracted by the image feature extraction circuitry; a camera classification circuitry configured to classify cameras having captured the captured images into groups, on a basis of a result of the grouping of the captured images by the image clustering circuitry; and a group-specific model generation circuitry configured to generate, by performing fine-tuning or transfer learning of an original learned neural network model for object detection or object recognition by using captured images taken by cameras in each of the groups into which the cameras are classified by the camera classification circuitry, a group-specific learned neural network model suitable for captured images taken by the cameras in the each of the groups.

In the above configuration, the captured images collected from each of the cameras installed in the plurality of facilities are grouped on the basis of the features of respective ones of the captured images, the cameras having captured the captured images are classified into groups on the basis of a result of the grouping of the captured images, and fine-tuning or transfer learning of the original learned neural network model for object detection or object recognition is performed using the captured images taken by the cameras in each of the groups into which the cameras are grouped. As a result, it is possible to generate a group-specific learned neural network model suitable for the captured images taken by the cameras in each of the groups (specialized for the captured images taken by the cameras in each of the groups); therefore, even if each of the group-specific learned neural network models is an extremely light learned neural network model, it is possible to perform highly accurate object detection process and object recognition process on the captured images taken by the cameras in each of the groups. In addition, even in a case where the captured images to be subjected to an object detection process and an object recognition process of the entire edge-side apparatuses are the captured images of the cameras of a large number of facilities, for example, several thousand stores, it is possible to group (classify) the cameras and to then perform fine-tuning or transfer learning of the original learned neural network model by using the captured images of a limited number of cameras having been grouped (for example, several hundred cameras). Therefore, even if the original learned neural network model is an extremely light learned neural network model, it is possible to increase the possibility that appropriate machine learning can be performed (it is possible to decrease the possibility that the learning cannot be sufficiently performed). Therefore, even in a case where the captured image to be subjected to an object detection process and an object recognition process of the entire edge-side apparatuses are the captured images taken by the cameras of a large number of facilities, for example, several thousand stores and, in addition, the original learned neural network model and each of the generated group-specific learned neural network models are extremely light learned neural network models, a highly accurate object detection process and object recognition process can be performed on the captured images taken by the cameras in each of the groups using one of the generated group-specific learned neural network models.

A server according to a second aspect of the present invention is connected through a network to an edge-side apparatus disposed in each of a plurality of facilities in which cameras are installed, and includes: a captured image collection circuitry configured to collect a captured image from each of the cameras; an image feature extraction circuitry configured to extract a feature from each of the captured images collected by the captured image collection circuitry; an image clustering circuitry configured to perform grouping of the captured images collected by the captured image collection circuitry, on a basis of the feature of each of the captured images, extracted by the image feature extraction circuitry; a camera classification circuitry configured to classify cameras having captured the captured images into groups, on a basis of a result of the grouping of the captured images by the image clustering circuitry; and a group-specific model generation circuitry configured to generate, by performing fine-tuning or transfer learning of an original learned neural network model for object detection or object recognition by using captured images taken by cameras in each of the groups into which the cameras are classified by the camera classification circuitry, a group-specific learned neural network model suitable for captured images taken by the cameras in the each of the groups.

In this configuration, it is possible to obtain an effect similar to that of the group-specific model generation system according to the first aspect.

A group-specific model generation program recorded in a non-transitory computer-readable recording medium according to a third aspect of the present invention causes a computer to execute a process including the steps of: collecting a captured image from each of cameras installed in a plurality of facilities; extracting a feature from each of the collected captured images; grouping the collected captured images on a basis of the extracted feature of each of the captured images; classifying cameras having captured the captured images into groups, on a basis of a result of the grouping of the collected captured images; and generating, by performing fine-tuning or transfer learning of an original learned neural network model for object detection or object recognition by using captured images taken by cameras in each of the groups into which the cameras are classified, a group-specific learned neural network model suitable for captured images taken by the cameras in the each of the groups.

Also in this configuration, it is possible to obtain the same effects as those of the group-specific model generation system according to the first aspect.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein:

FIG. 7 is an explanatory diagram of a grouping (classifying) process of built-in cameras denoted by S9 in FIG. 6;

FIG. 10 is a diagram illustrating inference accuracy evaluation indices and the like before and after fine-tuning of a certain group-specific learned DNN model generated by the group-specific model generation system.

DETAILED DESCRIPTION OF THE INVENTION

Figure 1:
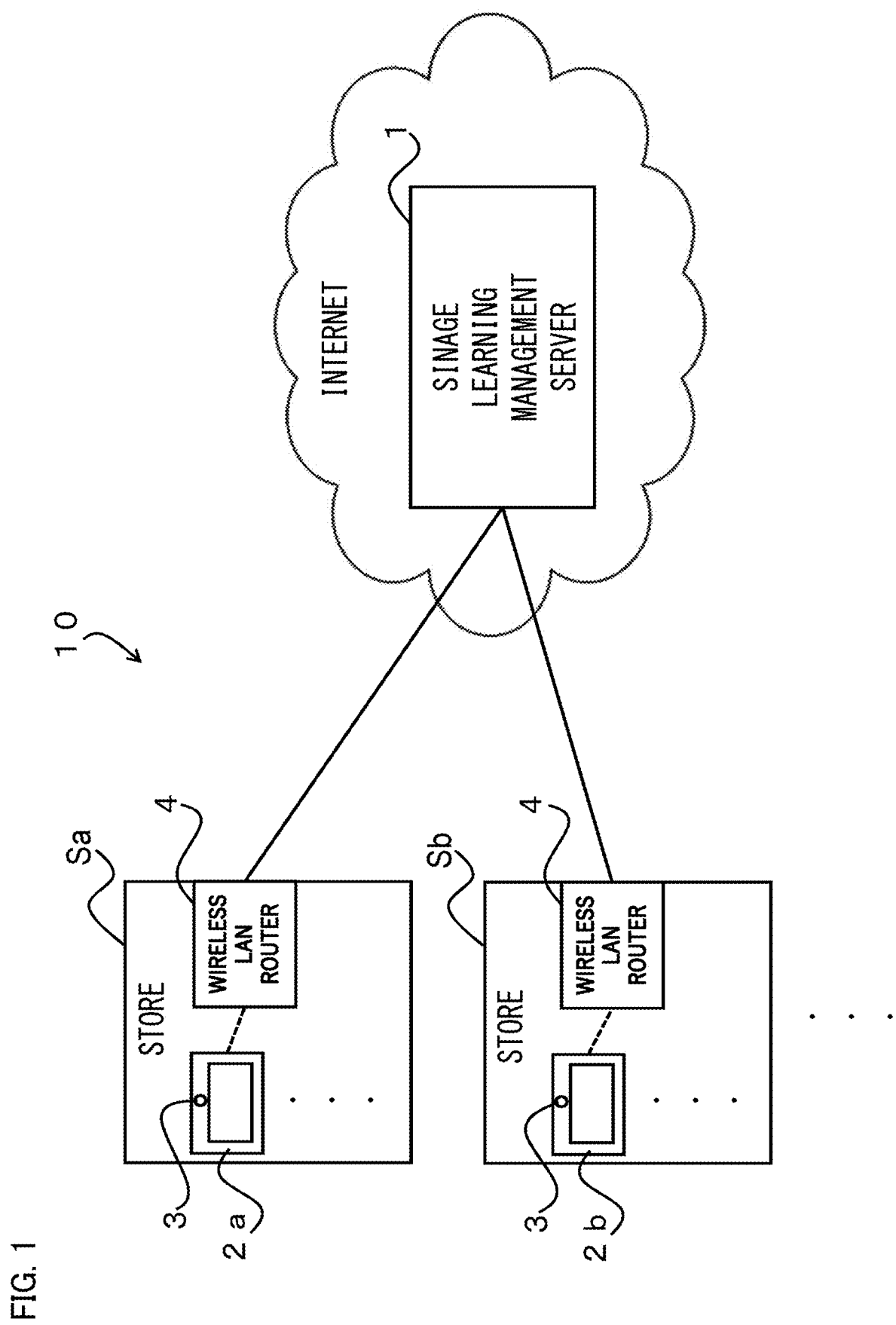
FIG. 1 is a block configuration diagram illustrating a schematic configuration of a group-specific model generation system according to an embodiment of the present invention.

Hereinafter, a group-specific model generation system, a server, and a group-specific model generation program according to an embodiment embodying the present invention will be described with reference to the drawings. FIG. 1 is a block configuration diagram illustrating a block configuration of a group-specific model generation system 10 according to the present embodiment. As illustrated in FIG. 1, the group-specific model generation system 10 mainly includes: signages 2a, 2b and the like ("edge-side apparatuses" in the claims), which are tablet terminals used for digital signages, installed in stores Sa, Sb and the like ("facility" in the claims) of a chain store; and a signage learning management server 1 (corresponding to "server" and "computer" in the claims) connected to the signages 2a, 2b and the like through the Internet. In the following description, the signage 2 is a generic term of the signages 2a, 2b and the like, and the store S is a generic term of the stores Sa, Sb, and the like. The group-specific model generation system 10 includes one or more signages 2 and a wireless LAN router 4 in each store S. Each signage 2 includes a built-in camera 3 ("camera" in the claims).

The signage 2 displays content such as an advertisement on its touch panel display 14 (see FIG. 2) to a customer who visits the store S (a customer who is in front of the signage 2), detects a customer appearing in a frame image on the basis of the frame image from the built-in camera 3, and performs image analysis processing such as attribute estimation of the detected customer.

The above signage learning management server 1 is a server installed in a management department (head office or the like) of the store S. Although details will be described later, the signage learning management server 1 generates a group-specific learned DNN (deep neural network) model suitable for the captured images taken by the built-in camera 3 of each signage 2, and transmits the generated group-specific learned DNN model to each signage 2 for installation.

Figure 2:
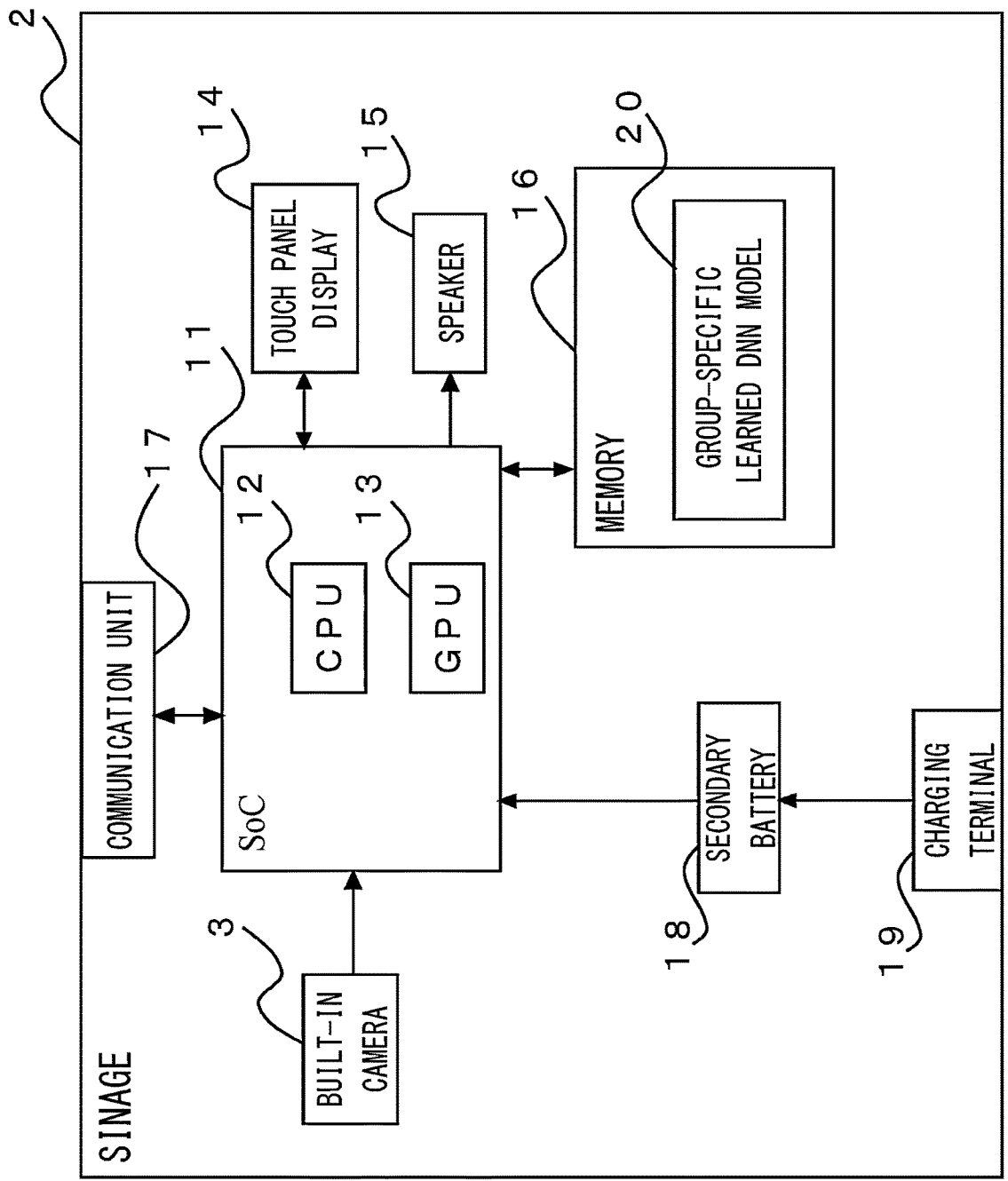
FIG. 2 is a block diagram illustrating a schematic hardware configuration of a signage in FIG. 1.

Next, a hardware configuration of the signage 2 of a tablet type will be described with reference to FIG. 2. In addition to the built-in camera 3, the signage 2 includes a system-on-a-chip (SoC) 11, a touch panel display 14, a speaker 15, a memory 16 that stores various data and programs, a communication unit 17, a secondary battery 18, and a charging terminal 19. The SoC 11 includes: a CPU 12 that controls the entire device and performs various calculations; and a GPU 13 used for inference processing of various learned deep neural network (DNN) models.

The memory 16 stores a group-specific learned DNN model 20 ("group-specific learned neural network model" in the claims) suitable for the captured images taken by the built-in camera 3 of the signage 2. The group-specific learned DNN model 20 includes a plurality of types of learned DNN models, and includes, for example, a learned DNN model for detecting a customer (person) (including a learned DNN model for detecting a face or a head of a customer) and a learned DNN model for customer (person) recognition such as attribute estimation of a customer. The communication unit 17 includes a communication IC and an antenna. The signage 2 is connected to the signage learning management server 1 on a cloud through the communication unit 17 and the Internet. The secondary battery 18 is a battery such as a lithium-ion battery that can be repeatedly used by being charged, stores DC power converted by an AC/DC converter from a commercial power source, and supplies the DC power to each part of the signage 2.

Figure 3:
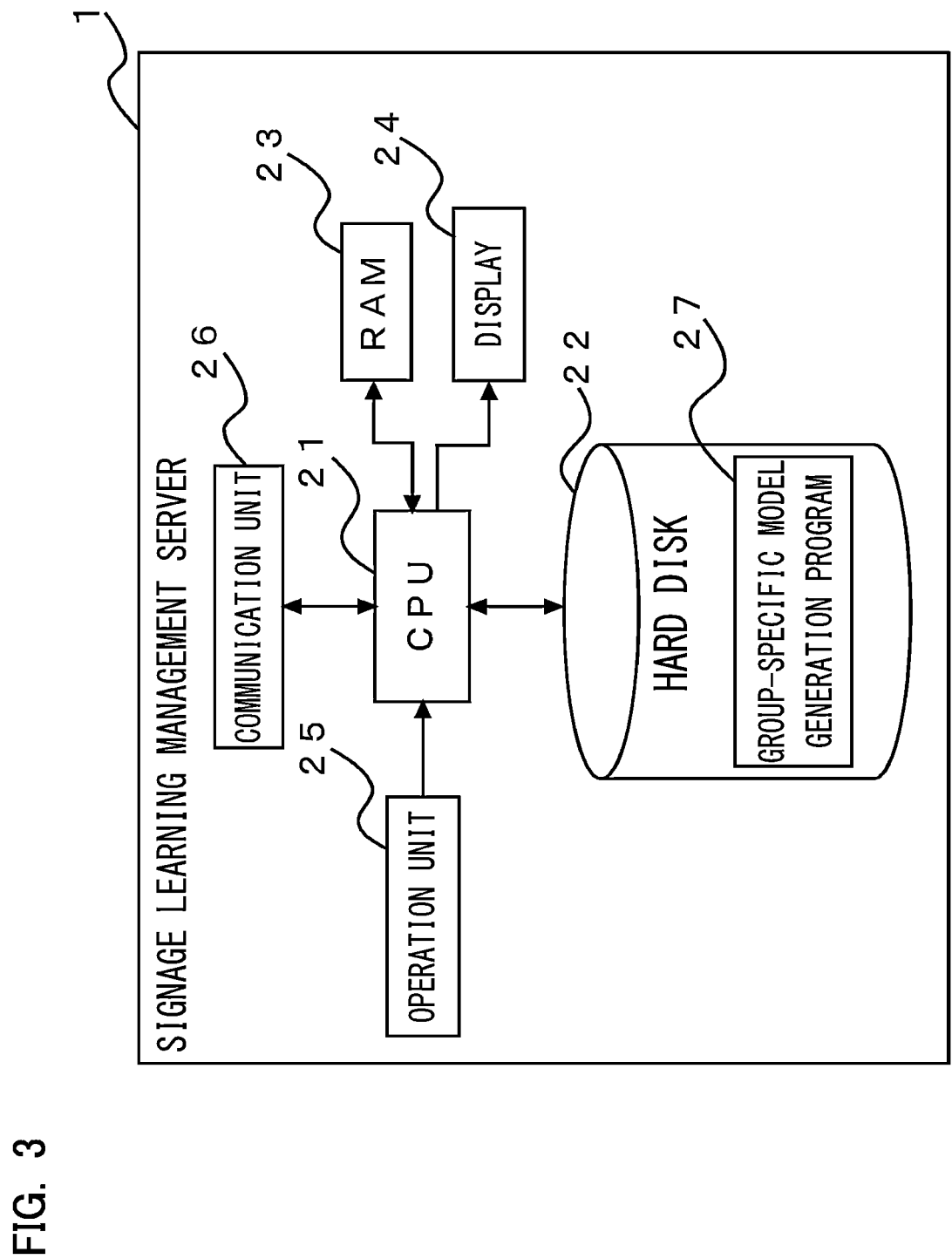
FIG. 3 is a block diagram illustrating a hardware configuration of a signage learning management server in FIG. 1.

Next, a hardware configuration of the signage learning management server 1 will be described with reference to FIG. 3. The signage learning management server 1 includes: a CPU 21 that controls the entire device and performs various calculations; a hard disk 22 ("non-transitory computer-readable recording medium" in the claims) that stores various data and programs; a random access memory (RAM) 23; a display 24; an operation unit 25; and a communication unit 26. A program stored in the hard disk 22 includes a group-specific model generation program 27.

Figure 4:
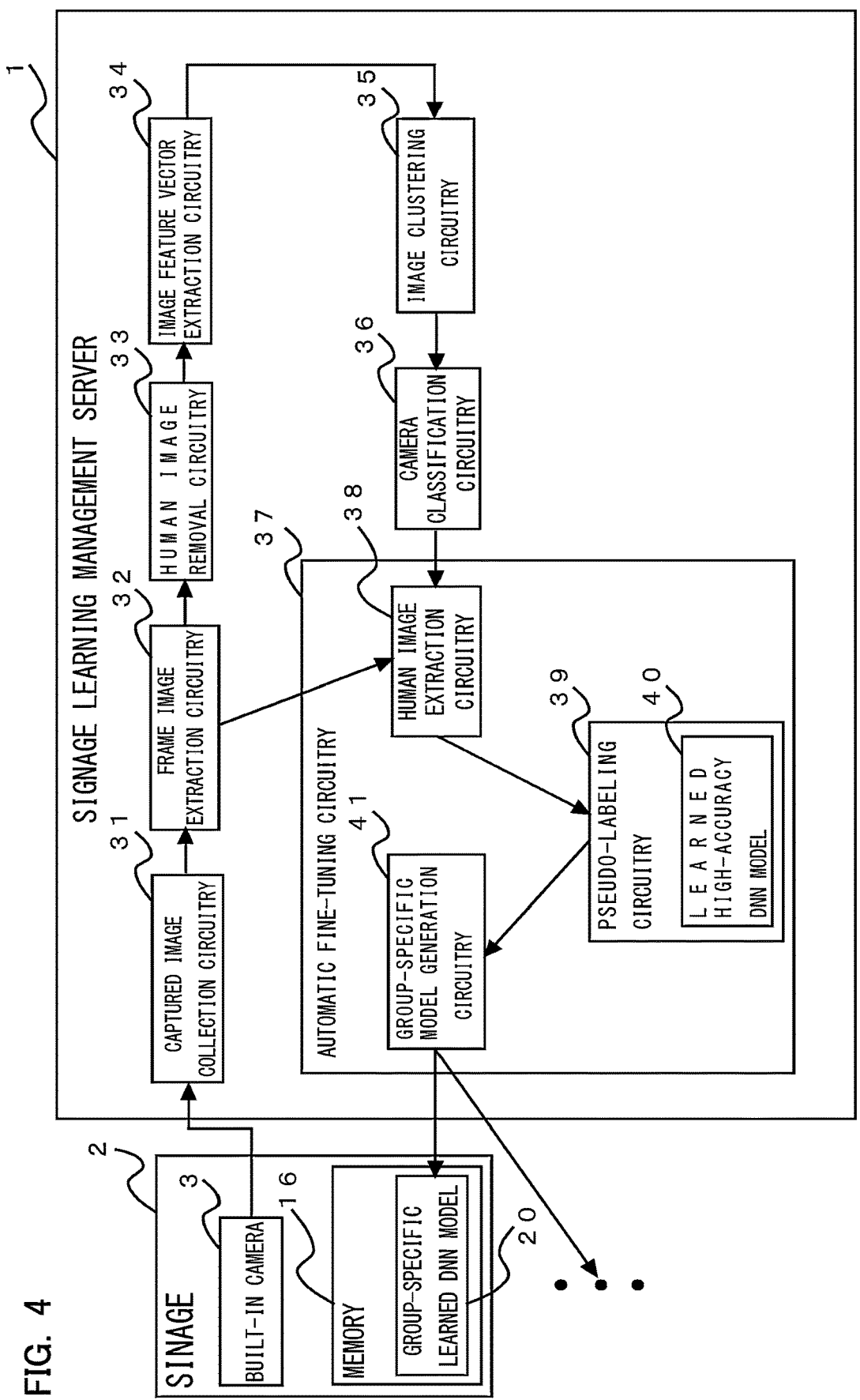
FIG. 4 is a functional block configuration diagram of the signage learning management server.

FIG. 4 mainly illustrates functional blocks of the signage learning management server 1. In the following description of FIG. 4, an outline of the function of each functional block in the diagram will be described. The signage learning management server 1 includes, as functional blocks: a captured image collection circuitry 31; a frame image extraction circuitry 32; a human image removal circuitry 33; an image feature vector extraction circuitry 34 (corresponding to "image feature extraction circuitry" in the claims); an image clustering circuitry 35; a camera classification circuitry 36; and an automatic fine-tuning circuitry 37. The automatic fine-tuning circuitry 37 includes: a human image extraction circuitry 38; a pseudo-labeling circuitry 39; and a group-specific model generation circuitry 41. The captured image collection circuitry 31 is implemented mainly by the communication unit 26 and the CPU 21 in FIG. 3. The frame image extraction circuitry 32, the human image removal circuitry 33, the image feature vector extraction circuitry 34, the image clustering circuitry 35, the camera classification circuitry 36, the automatic fine-tuning circuitry 37, the human image extraction circuitry 38, the pseudo-labeling circuitry 39, and the group-specific model generation circuitry 41 are implemented by the CPU 21 in FIG. 3 using the group-specific model generation program 27.

The captured image collection circuitry 31 collects captured images (in the present embodiment, a video (captured video) captured by each built-in camera 3) from each of the built-in cameras 3 of the signages 2 installed in the plurality of stores S. The frame image extraction circuitry 32 extracts frame images from the captured video taken by each built-in camera 3. The human image removal circuitry 33 removes captured images in which a person is photographed, from frame images (group of all the captured images) extracted by the frame image extraction circuitry 32, thereby extracting a "captured image group in which no person is photographed" (in other words, a group of captured store images). The image feature vector extraction circuitry 34 extracts a feature vector from each of the group of captured store images ("captured images of the facilities" in the claims) by using a learned DNN model for vector extraction. Then, the image clustering circuitry 35 groups the group of captured store images by a Gaussian Micture Model (GMM) on the basis of the feature vectors of the captured images extracted by the image feature vector extraction circuitry 34.

In addition, although details will be described later, the above camera classification circuitry 36 classifies the built-in cameras 3 that captured the captured images on the basis of the result of the grouping of the group of captured store images by the image clustering circuitry 35. The human image extraction circuitry 38 extracts captured images in which a person is photographed, from the captured images taken by the built-in camera 3 in each of the groups after the grouping by the camera classification circuitry 36. More precisely, with respect to all the frame images (group of all the captured images including captured images in which a person is photographed and captured images in which no person is photographed) extracted by the frame image extraction circuitry 32, the human image extraction circuitry 38 extracts captured images in which a person is photographed from the captured images (captured images in which a person is photographed and captured images in which no person is photographed) taken by the built-in cameras 3 in each of the groups after the grouping by the camera classification circuitry 36 is completed.

In addition, by using a learned high-accuracy DNN model 40 (corresponding to "learned high-accuracy neural network model" in the claims) which is for detection or recognition of a customer and with which it is possible to perform inference with higher accuracy than with the learned DNN model for detection or recognition of a customer on which the group-specific learned DNN model 20 stored in the memory 16 of the signage 2 is based, the pseudo-labeling circuitry 39 performs inference on the captured images (captured images in which a person is photographed) extracted by the human image extraction circuitry 38 from among the captured images taken by the built-in cameras 3 in the above groups, and the pseudo-labeling circuitry 39 assigns, as a correct label, a pseudo label based on the result of the inference to the captured images extracted by the human image extraction circuitry 38. Note that hereinafter the learned DNN model, on which the group-specific learned DNN model 20 stored in the memory 16 is based, is referred to as an "original learned DNN model." By performing fine-tuning on the original learned DNN model on the basis of the captured images taken by the built-in cameras 3 in the above groups and on the basis of the correct labels given to these captured images by the pseudo-labeling circuitry 39, the group-specific model generation circuitry 41 generates the group-specific learned DNN model 20 (corresponding to "group-specific learned neural network model" in the claims) suitable for the captured images taken by the built-in cameras 3 in each of the groups described above. By using the communication unit 26, the CPU 21 of the signage learning management server 1 transmits the group-specific learned DNN model 20 suitable for the captured images taken by the built-in cameras 3 in each of the groups described above to the signages 2 having the built-in camera 3 in the group corresponding to each group-specific learned DNN model 20, so that the group-specific learned DNN model 20 is stored in the signages 2. Note that the learned DNN model for detection or recognition of a customer on which the group-specific learned DNN model 20 is based corresponds to "original learned neural network model for object detection or object recognition" in the claims.

Figure 5:
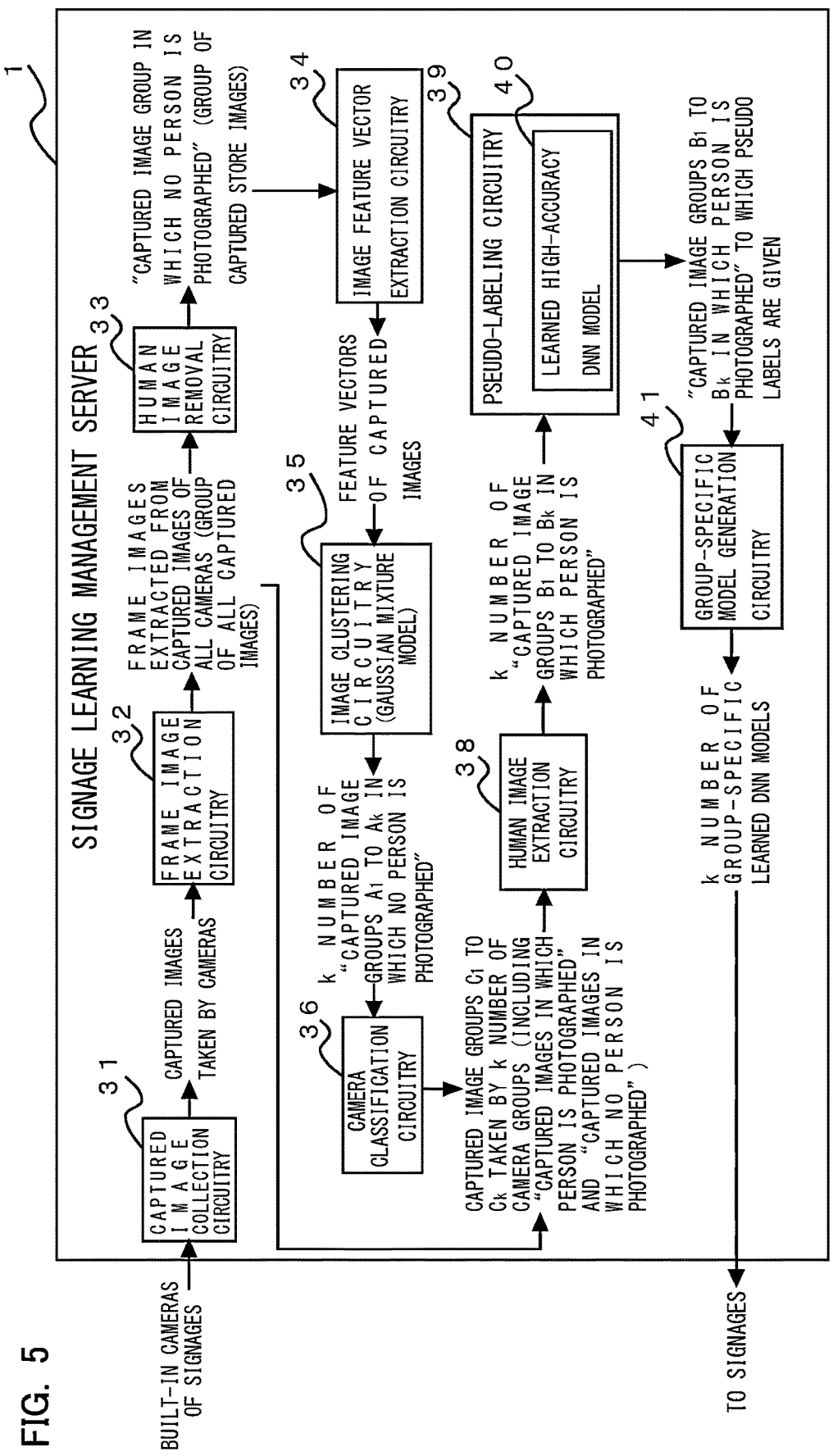
FIG. 5 is an explanatory diagram of a data flow between functional blocks in FIG. 4.
Figure 6:
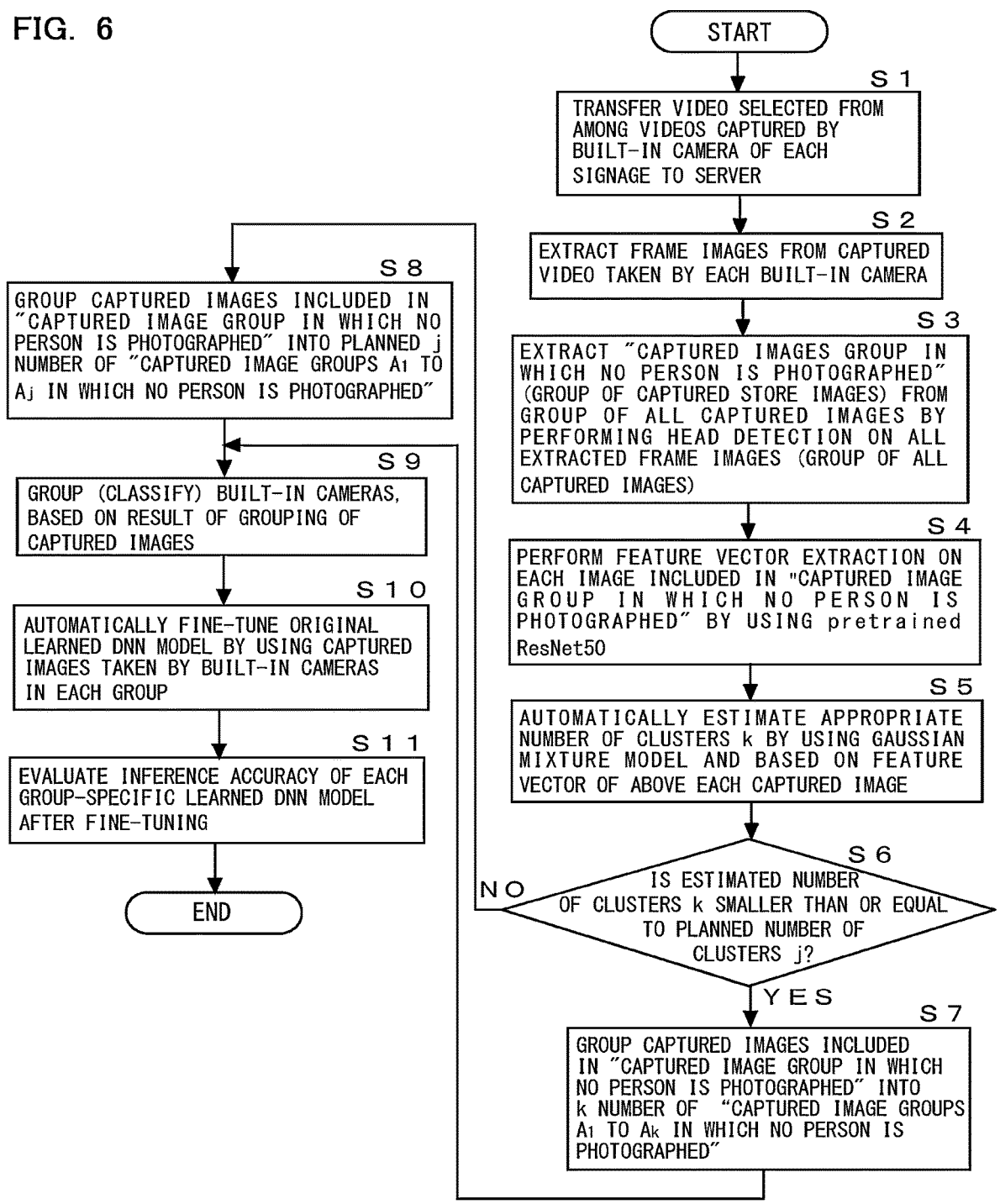
FIG. 6 is a flowchart of a group-specific learned DNN model generation process in the above group-specific model generation system.

Next, a data flow in the group-specific model generation system 10 will be described with reference to FIG. 5 and the flowchart in FIG. 6. FIG. 5 illustrates input/output data of each functional block of the signage learning management server 1 described with reference to the above FIG. 4. FIG. 6 is a flowchart of a group-specific learned DNN model generation process in the present group-specific model generation system 10. First, the captured image collection circuitry 31 of the signage learning management server 1 prompts each signage 2 to transfer a video selected from videos captured by the built-in camera 3 (a captured video in a specified time slot) to the signage learning management server 1. In response to this, each signage 2 transfers the captured video in the time slot specified by the captured image collection circuitry 31 of the signage learning management server 1 from among the videos (captured videos) captured by the built-in camera 3 of the signage 2 to the signage learning management server 1 (S1 in FIG. 6). Next, the frame image extraction circuitry 32 of the signage learning management server 1 extracts frame images from the captured video by each built-in camera 3 (S2 in FIG. 6). As illustrated in FIG. 5, an extraction process by the frame image extraction circuitry 32 creates the frame images (group of all the captured images (a set of a "captured image group in which a person is photographed" and a "captured image group in which no person is photographed")) extracted from the captured videos by all the built-in cameras 3.

Next, as illustrated in S3 in FIG. 6, the human image removal circuitry 33 of the signage learning management server 1 performs person's head detection on each of all the frame images (group of all the captured images (a set of a "captured image group in which a person is photographed" and a "captured image group in which no person is photographed")) extracted by the frame image extraction circuitry 32, and uses the result of the head detection to remove the "captured images in which a person is photographed" from the group of all the captured images, thereby extracting the "captured image group in which no person is photographed" (in other words, a captured image group in which only a store is photographed (hereinafter, referred to as a "group of captured store images"). More specifically, the human image removal circuitry 33 of the signage learning management server 1 performs detection of a "captured image in which a person is photographed" by using the learned DNN model for a (person's) head detection with respect to each of all the frame images (group of all the captured images) extracted by the frame image extraction circuitry 32, and removes all the detected "captured images in which a person is photographed" ("captured image group in which a person is photographed") from the group of all the captured images described above, thereby extracting the "captured image group in which no person is photographed". By the extraction process of the "captured image group in which no person is photographed" by the human image removal circuitry 33, one hundred "captured images in which no person is photographed" are extracted for each built-in camera 3, for example. Therefore, for example, when the number of built-in cameras 3 in the group-specific model generation system 10 (in short, the number of signages 2 connected to the signage learning management server 1) is 500, the number (100×500) of "captured images in which no person is photographed" ("captured store images") are collected by the extraction process by the human image removal circuitry 33. A set of these captured images (the "captured image group in which no person is photographed" (the "group of captured store images")) is used for grouping (classifying) of the built-in cameras 3 to be described later.

Next, as illustrated in FIGS. 5 and S4 in FIG. 6, the image feature vector extraction circuitry 34 of the signage learning management server 1 extracts a feature vector for each captured image included in the "captured image group in which no person is photographed" (the "group of captured store images") by using the pretrained ResNet50. As a result, as illustrated in FIG. 5, a feature vector (2048-dimensional feature vector) of each captured image included in the "captured image group in which no person is photographed" can be obtained. For example, as described above, in a case where the number (100×500) of "captured images in which no person is photographed" ("captured store images") are collected by the extraction process by the human image removal circuitry 33, the number (100×500) of 2048-dimensional feature vectors can be obtained.

Next, the image clustering circuitry 35 of the signage learning management server 1 performs grouping of the captured images included in the "captured image group in which no person is photographed" by using a Gaussian Micture Model on the basis of the feature vectors (2048-dimensional feature vectors) of the captured images. Specifically, the image clustering circuitry 35 first automatically estimates an appropriate number of clusters k by using the Gaussian Micture Model based on the feature vectors (2048-dimensional feature vectors), of the captured image, extracted by the image feature vector extraction circuitry 34 (S5). A method of estimating the appropriate number of clusters k by using the Gaussian Micture Model will be described in detail later.

Next, the image clustering circuitry 35 of the signage learning management server 1 checks whether or not the estimated number of clusters k is less than or equal to a planned (assumed upper limit) number of clusters j (S6). As a result, in a case where the estimated number of clusters k is less than or equal to the planned number of clusters j (YES in S6), the image clustering circuitry 35 groups the captured images included in the "captured image group in which no person is photographed" extracted by the human image removal circuitry 33 into the k number of "captured image groups $A_1$ to $A_k$ in which no person is photographed" (S7). In the determination in S6, in a case where the number of clusters k estimated using the Gaussian Micture Model is a number exceeding the planned number (assumed upper limit number) of clusters j (NO in S6), the image clustering circuitry 35 groups the captured images included in the "captured image group in which no person is photographed" extracted by the human image removal circuitry 33 into j number of "captured image groups $A_1$ to $A_j$ in which no person is photographed", where j is the planned number (assumed upper limit number) of clusters (S8). Note that FIG. 5 illustrates an example in which the image clustering circuitry 35 groups the captured images included in the "captured image group in which no person is photographed" extracted by the human image removal circuitry 33 into the k number of "captured image groups $A_1$ to $A_k$ in which no person is photographed".

Next, the camera classification circuitry 36 of the signage learning management server 1 groups (classifies) the built-in cameras 3 that have captured the captured images, on the basis of the result of the grouping of the captured images by the image clustering circuitry 35 (S9).

The above grouping of the built-in cameras 3 will be described with reference to FIG. 7. A camera ID of the built-in camera 3 is assigned to each image, in the k number of "captured image groups $A_1$ to $A_k$ in which no person is photographed" into which the image clustering circuitry 35 grouped the captured images. The camera ID is information that each captured image of the "captured image groups $A_1$ to $A_k$ in which no person is photographed" has inherited from the corresponding one of the captured images (respective ones of the captured images of the group of all the captured images) extracted by the frame image extraction circuitry 32. By referring to the above camera ID assigned to each image of the "captured image groups $A_1$ to $A_k$ in which no person is photographed", it is possible to easily determine the camera ID of each of the built-in cameras 3 that captured the "captured store images" ("captured images in which no person is photographed") in each of the groups into which the captured images are grouped by the image clustering circuitry 35. In other words, by referring to the above camera ID assigned to each image of the "captured image groups $A_1$ to $A_k$ in which no person is photographed", it is possible to easily determine the correspondence relationship between the camera IDs and the groups.

For example, the following assumption is made for the sake of simpler description: the number of clusters k estimated by the image clustering circuitry 35 is 2; and the image clustering circuitry 35 groups the captured images that are included in the "captured image group in which no person is photographed" and are extracted by the human image removal circuitry 33 into a group 1 and a group 2 as illustrated in FIG. 7. With reference to FIG. 7, most of the captured images ("captured store images") included in the group 1 are captured images taken by the built-in cameras 3 having the camera IDs 1 to 21. For example, the group 1 includes 45 captured images with the camera ID 0 and slightly less than 100 of captured images with the camera ID 1, but the group 2 does not include any captured image with the camera ID 0 or the camera ID 1. From this fact, it can be seen that the camera ID 0 and the camera ID 1 correspond not to the group 2 but to the group 1. Similarly, since the captured images with the camera IDs 2 to 21 are included only in the group 1 and are not included in the group 2, the camera IDs 2 to 21 correspond not to the group 2 but to the group 1.

In addition, in FIG. 7, the captured images with the camera ID 31 are included in both the group 1 and the group 2. However, the group 1 includes only a few images with the camera ID 31, whereas the group 2 includes slightly less than 80 images with the camera ID 31. Therefore, on the basis of majority decision, the camera ID 31 corresponds not to the group 1 but to the group 2. As described above, in a case where the captured images of each camera ID are included across a plurality of groups, the each camera ID corresponds to the group including the most number of captured images with the each camera ID. Note that, in a case where the clustering by the image clustering circuitry 35 is successful, the captured images with each camera ID are rarely included across a plurality of groups, and even in a case where the captured images with each camera ID are included across a plurality of groups, there is a large difference between the numbers of captured images (the number of images) belonging to respective ones of the groups.

Since the correspondence relationship between the camera IDs and the groups is known as described above, the camera classification circuitry 36 illustrated in FIG. 5 performs grouping, of the built-in cameras 3, illustrated in the above S9 in accordance with the correspondence relationship, and classifies the built-in cameras 3 into the k (or j) number of groups. The automatic fine-tuning circuitry 37 illustrated in FIG. 4 performs automatic fine-tuning of the original learned DNN model (the learned DNN model for detecting or recognizing of a customer (person) on which the above group-specific learned DNN model 20 is based on) by using the captured images taken by the built-in cameras 3 in each of the groups into which the captured images are classified by the camera classification circuitry 36 (S10 in FIG. 6). Note that the above-described learned DNN model for detecting a customer (person) includes a learned DNN model for detecting a face and head of a customer.

Details of the automatic fine-tuning by the automatic fine-tuning circuitry 37 are as follows. That is, first, the automatic fine-tuning circuitry 37 groups, by referring to the camera IDs assigned to the frame images, all the frame images (the group of all the captured images including the captured images in which a person is photographed and the captured images in which no person is photographed) extracted by the frame image extraction circuitry 32 into captured image groups $C_1$ to $C_k$ captured by the built-in cameras 3 in the k number of groups into which the captured images are classified by the camera classification circuitry 36 (hereinafter, the groups $C_1$ to $C_k$ are referred to as the "captured image groups $C_1$ to $C_k$ captured by the k number of camera groups"). Here, the "camera groups" mean the groups of the built-in cameras 3 into which the built-in cameras 3 are classified by the camera classification circuitry 36. Then, as illustrated in FIG. 5, the automatic fine-tuning circuitry 37 extracts, by using the human image extraction circuitry 38, the captured images in which a person is photographed from the k number of captured image groups $C_1$ to $C_k$ (including captured images in which a person is photographed and captured images in which no person is photographed) captured by the above k number of camera groups, thereby generating k number (of camera groups) of "captured image groups $B_1$ to $B_k$ in which a person is photographed". A learned DNN model for human head detection, which is used for the above extraction of the "captured images in which a person is photographed" by the human image extraction circuitry 38, is similar to the model used for detection of the "captured images in which a person is photographed" by the human image removal circuitry 33.

When the process of generating the k number of "captured image groups $B_1$ to $B_k$ in which a person is photographed" by the human image extraction circuitry 38 is completed, the automatic fine-tuning circuitry 37 performs, as illustrated in FIG. 5 and by using the pseudo-labeling circuitry 39, inference on the k number of "captured image groups $B_1$ to $B_k$ in which a person is photographed" by using the learned high-accuracy DNN model 40 (for detection or recognition of a customer) with which it is possible to perform inference with higher accuracy than with the original learned DNN model, and the automatic fine-tuning circuitry 37 then gives, as a correct label, a pseudo label based on the result of the inference to each captured image included in the "captured image groups $B_1$ to $B_k$ in which a person is photographed".

Then, as illustrated in FIG. 5, the automatic fine-tuning circuitry 37 performs fine-tuning of the original learned DNN model by using each of the captured image groups $B_1$ to $B_k$ included in the "captured image groups $B_1$ to $B_k$ in which a person is photographed" to which the pseudo labels are given by the group-specific model generation circuitry 41, thereby generating k number of group-specific learned DNN models 20 suitable for the captured images taken by the built-in cameras 3 in respective ones of the k number of groups. That is, for example, by performing fine-tuning of the original learned DNN model on the basis of each captured image included in the captured image group $B_1$ and on the basis of the correct label given to the each captured image, the group-specific learned DNN model 20 suitable for the captured images taken by the built-in cameras 3 in the (first) camera group corresponding to the captured image group $B_1$ is generated, and by performing fine-tuning of the original learned DNN model on the basis of each captured image included in the captured image group $B_2$ and on the basis of the correct label given to the each captured image, the group-specific learned DNN model 20 suitable for the captured images taken by the built-in cameras 3 in the (second) camera group corresponding to the captured image group $B_2$ is generated. Here, the fine-tuning means relearning the weights of the overall learned DNN model to be newly generated, taking the weights of the original (existing) learned DNN model as initial values.

Next, the CPU 21 of the signage learning management server 1 evaluates the inference accuracy of each group-specific learned DNN model 20 after the fine-tuning by the group-specific model generation circuitry 41 is completed (S11). The evaluation of the inference accuracy of each group-specific learned DNN model 20 after the fine-tuning will be described in detail in the description of FIG. 10 to be described later; however, in a case where the inference accuracy (F1 value or the like) of each group-specific learned DNN model 20 after the fine-tuning significantly increases as compared with the original learned DNN model before the fine-tuning, it can be evaluated that the result of the grouping by the image clustering circuitry 35 is appropriate. When the result of the grouping by the image clustering circuitry 35 is appropriate, each of the group-specific learned DNN models 20 after the above fine-tuning is transmitted to and stored in the signage 2 having the built-in camera 3 belonging to the camera group corresponding to one of the captured image groups $B_1$ to $B_k$ used for the fine-tuning of the each of the group-specific learned DNN models 20.

By periodically repeating the process of S1 to S11 in FIG. 6 as necessary, even if the layout or environment (light conditions, interior decoration, or the like) of each store S changes, it is possible to maintain sufficient accuracy of each group-specific learned DNN model 20 generated by the group-specific model generation system 10.

Figure 8:
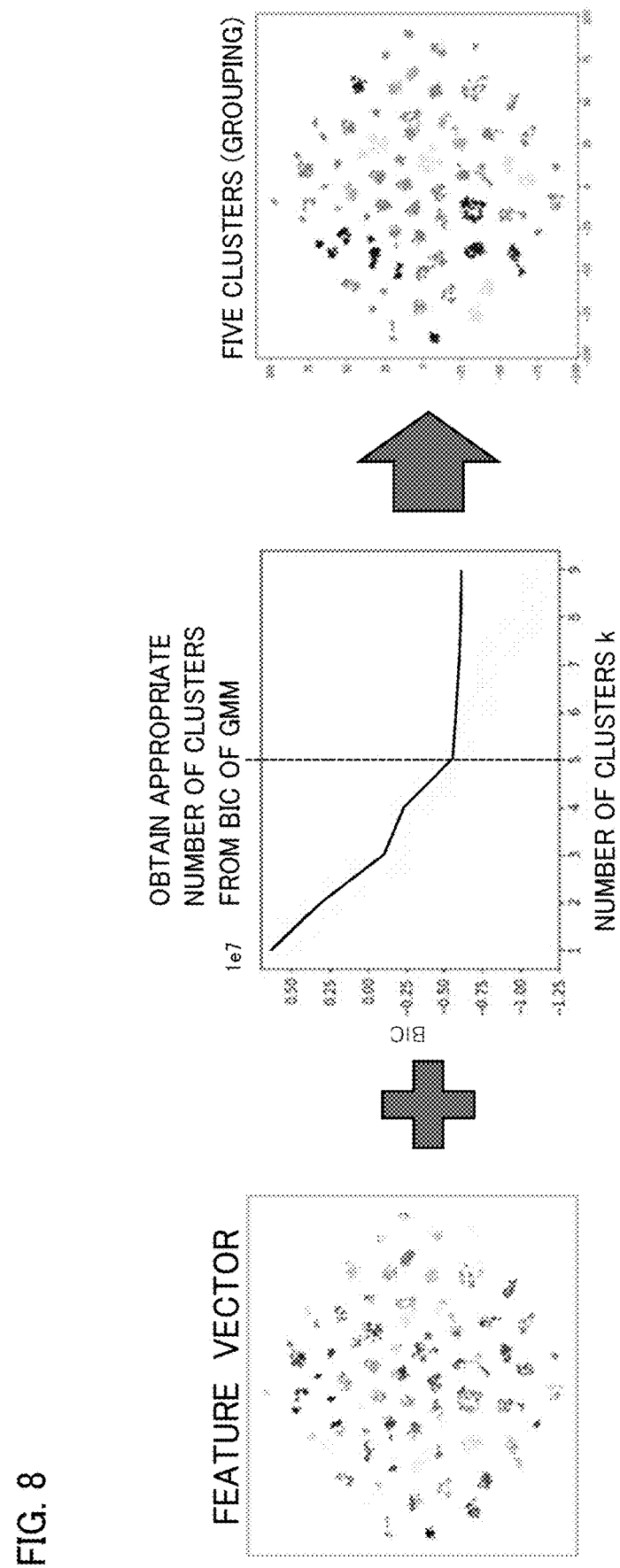
FIG. 8 is an explanatory diagram of an estimation process, denoted by S5 in FIG. 6, of an appropriate number of clusters by using a Gaussian Micture Model.

Next, with reference to FIG. 8, a description will be given in detail on the method, described in S5 above, for estimating the appropriate number of clusters k by using the Gaussian Micture Model. The diagram on the left side in FIG. 8 is a distribution diagram of the two-dimensional feature vectors of respective ones of the captured images. In the diagram, the 2048-dimensional feature vectors of the respective captured images extracted, by the image feature vector extraction circuitry 34 using the pretrained ResNet50, from the respective captured images included in the "captured image groups in which no person is photographed" captured by the built-in cameras 3 of the signages 2 in all the stores are visualized by being dimensionally reduced into two dimensions by using the t-distributed Stochastic Neighbor Embedding (tSNE) algorithm Because (the distribution of) the 2048-dimensional feature vectors themselves extracted by the image feature vector extraction circuitry 34 cannot be visualized, the above distribution diagram illustrates the distribution of the feature vectors dimensionally reduced into two dimensions by the tSNE. However, in clustering processing in the image clustering circuitry 35 using the Gaussian Micture Model, the 2048-dimensional feature vectors of the captured images extracted by the image feature vector extraction circuitry 34 are used.

Specifically, the image clustering circuitry 35 calculates, while varying the number of clusters that is the number of the groups of the captured images (in other words while varying the number of Gaussian distributions included in the Gaussian Micture Model), a value of a Bayesian information criterion (BIC) for each number of clusters on the basis of (the distribution of) the (2048-dimensional) feature vectors of the captured images extracted by the image feature vector extraction circuitry 34 and by using the Gaussian Micture Model, and then the image clustering circuitry 35 obtains the number of clusters suitable for the distribution of the feature vectors of the captured images extracted by the image feature vector extraction circuitry 34 on the basis of the calculated value of the BIC corresponding to each number of clusters. That is, first, the image clustering circuitry 35 sequentially specifies one of the numbers of clusters (the number of Gaussian distributions included in the Gaussian Micture Model) as 1 to 9, one at a time, and calculates the value of the BIC for each number of clusters by using the Gaussian Micture Model on the basis of (the distribution of) the (2048-dimensional) feature vectors, of the captured images, extracted by the image feature vector extraction circuitry 34. The diagram in the middle (center) in FIG. 8 is a line graph illustrating the relationship between the number of clusters k and the value of the BIC calculated as described above, where "1 e7" in the diagram represents $1 \times 10^7$.

Then, the image clustering circuitry 35 sets the number of clusters (5, in the example of this diagram) at a time point when the gradient is settled in the line graph, to the number of clusters suitable for the distribution of the feature vectors of the captured images extracted by the image feature vector extraction circuitry 34. As the number of clusters at the time point when the gradient is settled, the following number of clusters is adopted. This is the number of clusters immediately before a number of clusters at which the change amount (decrease amount) of the value of the BIC becomes extremely small when the following two amounts are compared. One of the two amounts to be compared is the change amount of the value of the BIC in the previous section (for example, the amount of change in the value of the BIC between the number of clusters 4 and the number of clusters 5 in the line graph), and the other of the two amounts to be compared is the change amount of the value of the BIC in the next section (for example, the amount of change in the value of the BIC between the number of clusters 5 and the number of clusters 6). The reason is as follows. If the number of clusters is too large, the number of times of processing of fine-tuning of the original learned DNN model described in S10 in the above FIG. 6 increases; therefore, it is desirable to adopt as small a number of clusters k as possible if the value of the BIC, which is an index of the optimal model, hardly change even when the number of clusters k is increased. Here, in general, the value of the BIC is preferably smaller.

In the line graph illustrated in the diagram in the middle in FIG. 8, since the number of clusters at a time point when the gradient is settled is 5, the number of clusters suitable for the distribution of the feature vectors of the captured image obtained from the values of the BICs of the Gaussian Micture Model is 5. The diagram on the right side in FIG. 8 is a distribution diagram in which two-dimensional feature vectors (after reduction in dimensions) of each captured image in the distribution diagram on the left side in FIG. 8 are grouped into the groups 1 to 5 by colors in accordance with the appropriate number of clusters (=5). Note that, in general, a color drawing cannot be used in a patent application; therefore, in the diagram on the right side in FIG. 8, the group of each feature vector is depicted in gray scale. In addition, the left-side diagram and the right-side diagram in FIG. 8 are diagrams to illustrate a method of estimating the appropriate number of clusters k by using the Gaussian Micture Model, and the distribution diagrams of the feature vectors whose dimension are reduced to two dimensions are not used in actual clustering processing by the image clustering circuitry 35. However, the left-side diagram in FIG. 8 is used in some cases to confirm how many groups the captured images included in the "captured image group in which no person is photographed" by the built-in cameras 3 of the signages 2 of all the stores should be grouped into.

Figure 9:
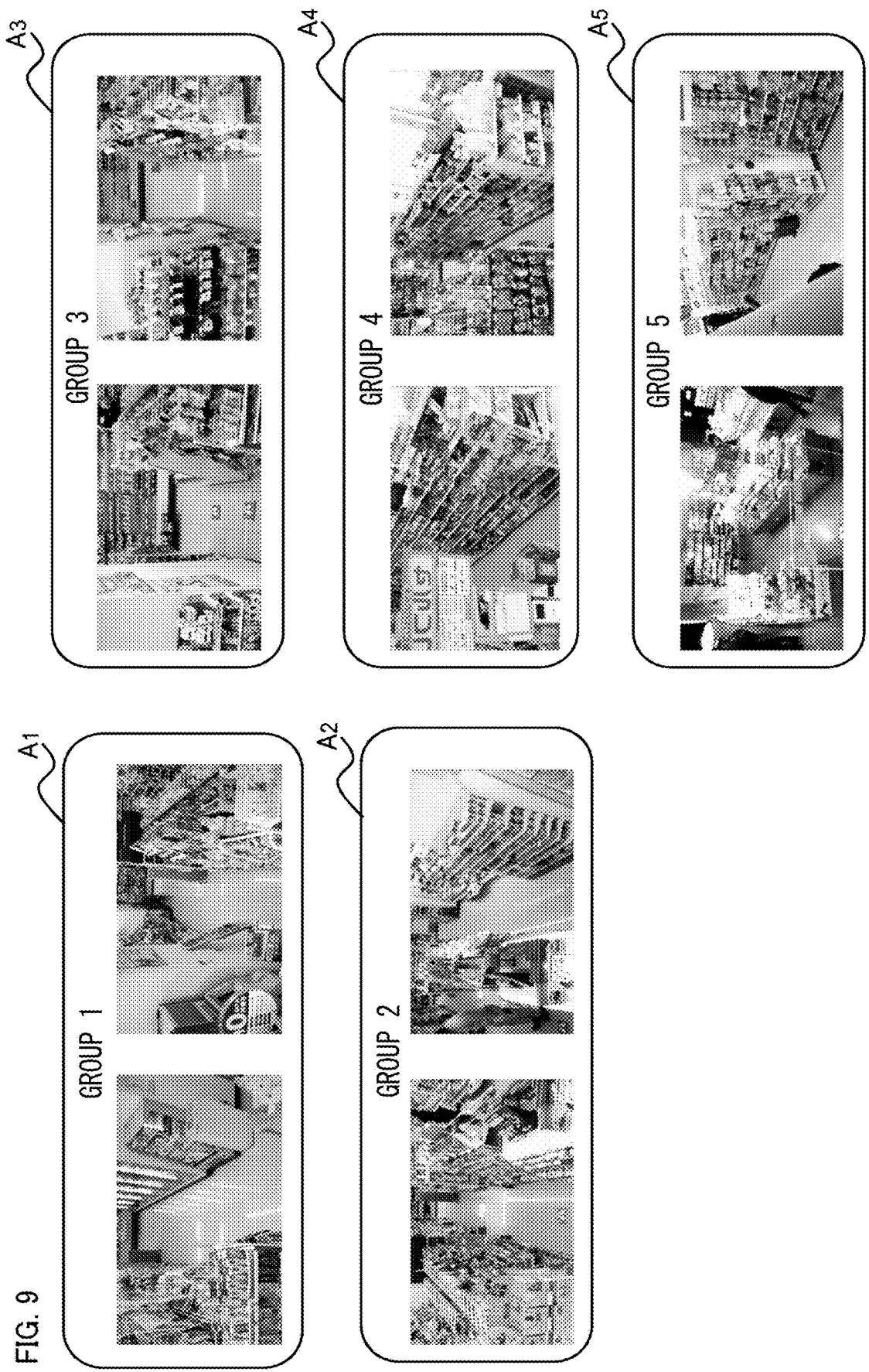
FIG. 9 is a diagram illustrating a result of a grouping process, denoted by S7 in FIG. 6, of captured images included in a "captured image group in which no person is photographed", and shows examples of captured images included in each of the groups.

FIG. 9 is a diagram illustrating an example of the captured images included in each group in a case where the captured images included in the "captured image group in which no person is photographed" ("group of captured store images") are grouped into five "captured image groups $A_1$ to $A_5$ in which no person is photographed" (grouped into the captured image groups of the groups 1 to 5) by the processing of S7 in FIG. 6. By performing the grouping of the captured images in the above S7, folders each corresponding to one of the captured image groups $A_1$ to $A_5$ of the groups 1 to 5 are automatically generated, and the captured images in each group are stored in the folder corresponding to the each group.

In the example illustrated in FIG. 9, the captured images in the captured image group of the group 1 (captured image group $A_1$) are captured images of areas in stores each of which has a layout in which the passage is in the middle and the store shelf and the walls are on the left and right of the passage. The captured images in the captured image group of the group 2 (captured image group $A_2$) are captured images of areas in stores each of which has a layout in which the passage is slightly narrower and the store shelves are on the left and right of the passage. The captured images of the captured image group of the group 3 (captured image group $A_3$) are captured images of areas in stores each of which has a layout in which a wall is on one of the left and right sides of the passage, a store shelf is the other side, and the back side of the passage is closed by a store shelf. The captured images of the captured image group of the group 4 (captured image group $A_4$) are captured images of areas in stores each of which is captured from an obliquely upward direction with respect to the passage by the built-in camera 3 of a signage 2 installed in a place at a corner of a store. The captured images of the captured image group of the group 5 (captured image group $A_5$) are captured images of areas in stores each of which is captured from an obliquely upper direction with respect to the passage by the built-in camera 3 of a signage 2 and in each of which a flare is occurring. However, the captured images in each of the groups 1 to 5 illustrated in FIG. 9 are merely examples.

As illustrated in FIG. 9, the captured image groups $A_1$ to $A_5$ of the respective groups are formed by collecting the captured images having similar features that reflect the layout, the light condition, the interior decoration, and the like in each store.

Next, the evaluation of the inference accuracy of each group-specific learned DNN model 20 after fine-tuning described in S11 of the above FIG. 6 will be described with reference to FIG. 10. FIG. 10 illustrates, in comparison with inference accuracy evaluation indices and the like of the original learned DNN model before fine-tuning, inference accuracy evaluation indices and the like such as the F1 value (also referred to as "F value") of the group-specific learned DNN model 20 that corresponds to the fifth camera group and is generated by fine-tuning the original learned DNN model on the basis of each of the captured images included in the fifth captured image group $B_5$ (captured image group in which a person is photographed) and its correct label (pseudo label). In FIG. 10, TP (true positive) represents "what is predicted to be true and actually true" (for example, what is predicted to be a human head and actually a human head), FP (false positive) represents "what is predicted to be true but actually false" (for example, what is predicted to be a human head but actually not a human head), and FN (false negative) represents "what is predicted to be false but actually true" (for example, what is predicted not a human head but actually a human head).

Precision in FIG. 10 is a so-called precision ratio and indicates a ratio of actually true data among data predicted to be true. When expressed by a formula, Precision=TP/(TP+FP). Recall is a so-called recall ratio, and indicates the proportion of what is predicted to be true among actually true data. When expressed by the formula, Recall=TP/(TP+FN). The F1 value (F value) is a harmonic average of Recall (recall ratio) and Precision (precision ratio), and expressed by an expression: F1 value=(2×Precision×Recall)/(Precision+Recall).

The table illustrated in FIG. 10 shows the following fact. As compared with the original learned DNN model before fine-tuning, in the group-specific learned DNN model 20 after fine-tuning, the value of TP, which is an index of contribution to the detection rate, is greatly improved, and the value of FN, which is an index of non-detection, is greatly reduced. Therefore, it can be seen that the inference accuracy evaluation indices such as Precision, Recall, and F1 value are all greatly improved in the group-specific learned DNN model 20 after fine-tuning as compared with the original learned DNN model before fine-tuning. In the table illustrated in FIG. 10, the value of FP, which is an index of erroneous detection, slightly increases after fine-tuning; however, since evaluation indices such as Precision, Recall, and F1 value are significantly improved, there is no particular problem from the viewpoint of actual operation. With reference to the table illustrated in FIG. 10, the improvement of the evaluation indices such as the F1 value after the fine-tuning of the group-specific learned DNN model 20 corresponding to the fifth camera group has been described. However, the evaluation indices such as the F1 value after the fine-tuning is also greatly improved for the group-specific learned DNN model 20 corresponding to each of the first to fourth camera groups generated together with the group-specific learned DNN model 20 corresponding to the fifth camera group.

In the description of the above FIG. 8, it has been described that, because too large a number of clusters (the number of (camera) groups) increases the number of times of processing of fine-tuning of the original learned DNN model, it is desirable to employ as small a number of clusters k as possible if the value of the BIC, which is an index of the optimal model, hardly change when the number of clusters k is increased. The same applies to the inference accuracy evaluation indices such as the above Precision, Recall, and F1 value. That is, when the following case occurs, the image clustering circuitry 35 adopts the value k as the number of clusters (number of groups). The image clustering circuitry 35 continuously increases the number of clusters (number of groups), and when the image clustering circuitry 35 increases the number of clusters from (k−1) to k, the value of the BIC (obtained by the Gaussian Micture Model) and the values of the inference accuracy evaluation indices such as the F1 value significantly increases (improves); however, the value of the BIC and the inference accuracy evaluation indices such as the F1 value do not significantly change when the image clustering circuitry 35 increases the number of clusters from k to (k+1). This is because if the number of clusters (number of (camera) groups) is too large, the number of times of processing of fine-tuning of the original learned DNN model increases. That is, the image clustering circuitry 35 adopts the value of the number of clusters k with which the following two items are well balanced when the number of clusters (number of groups) is continuously increased: the increase in the values of the evaluation indices (decrease in the case of the BIC); and the number of clusters (number of groups), in other words, how small the number of clusters (number of groups) is. As an index for determining the number of clusters (number of groups), it is possible to use only the value of the BIC, which is an index of the optimal model as described in the description of FIG. 8, it is possible to use only the inference accuracy evaluation indices such as Precision, Recall, and F1 value, or it is possible to use the value of the BIC and the inference accuracy evaluation indices such as F1 value in combination.

As described above, according to the group-specific model generation system 10, the signage learning management server 1, and the group-specific model generation program 27 recorded in the hard disk 22 of the present embodiment, the captured images collected from each of the built-in cameras 3 of the signages 2 installed in a plurality of stores are grouped by using the Gaussian Micture Model on the basis of the feature vectors of the captured images, the built-in cameras 3 that captured the captured images are grouped on the basis of the result of the grouping of the captured images, and the original learned DNN model (for detection or recognition of a customer) is fine-tuned using the captured images taken by the built-in cameras 3 in each of the groups into which the built-in cameras 3 are classified. As a result, it is possible to generate a group-specific learned DNN model 20 that is suitable for the captured images taken by the built-in cameras 3 in each group (that is specialized for the captured images taken by the built-in cameras 3 in each group); therefore, even if the group-specific learned DNN models 20 are extremely light learned DNN models, it is possible to perform highly-accurate customer detection process and customer recognition process on the captured images taken by the built-in cameras 3 in respective ones of the group. In addition, even in a case where the captured images to be subjected to a customer detection process and a customer recognition process by all the signages 2 in the group-specific model generation system 10 are the captured images taken by the built-in cameras 3 of the signages 2 installed in a large number of stores, for example, several thousand stores, it is possible to group these built-in cameras 3 and to perform fine-tuning of the original learned DNN model by using captured images of a limited number of the built-in cameras 3 after the grouping (for example, several hundred built-in cameras 3). Therefore, it is possible to increase the possibility that appropriate machine learning can be performed even if the original learned DNN model is an extremely light learned DNN model (it is possible to lower the possibility that learning cannot be fully completed). Therefore, even in a case where the captured images to be subjected to a customer detection process and a customer recognition process by all the signages 2 in the group-specific model generation system 10 are the captured images taken by the built-in cameras 3 of the signages 2 installed in a large number of stores, for example, several thousand stores and, in addition, the original learned DNN model and each of the group-specific learned DNN models 20 generated as described above are extremely light learned DNN models, it is possible to perform a highly-accurate customer detection process and customer recognition process on the captured images taken by the built-in cameras 3 in each group by using corresponding one of the generated group-specific learned DNN models 20.

In the group-specific model generation system 10 of the present embodiment, the group-specific learned DNN model 20 that is generated by the group-specific model generation circuitry 41 and is suitable for the captured images taken by the built-in cameras 3 in each group is transmitted to and stored in the edge-side apparatuses disposed in the stores where the built-in cameras 3 of the each group are installed, in other words, transmitted to and stored in the signages 2 having the corresponding built-in cameras 3, and a customer detection process and a customer recognition process are performed, by the signages 2, on the captured images taken by the built-in cameras 3 of the each group. As a result, the signage 2 including a built-in camera 3 in each group can perform a highly-accurate customer detection process and customer recognition process with respect to the captured images by its own built-in camera 3.

In addition, in the group-specific model generation system 10 of the present embodiment, inference is performed on the captured images taken by the built-in cameras 3 in each group by using the learned high-accuracy DNN model 40 for detection or recognition of a customer, with which it is possible to perform inference with higher accuracy than with the original learned DNN model for detection or recognition of a customer, pseudo labels based on the result of the inference are given as correct labels to the captured images taken by the built-in cameras 3 in each group, and fine-tuning is performed on the original learned DNN model for detection or recognition of a customer on the basis of the captured images taken by the built-in cameras 3 in each group and on the basis of the correct labels (pseudo labels) given to the captured images taken by the built-in cameras 3 in the each group. As a result, it is possible to automatically give a correct label to each of the captured images taken by the built-in cameras 3 in each group and to automatically perform fine-tuning of the above-described learned DNN model. That is, the above fine-tuning of the original learned DNN model can be performed without a person performing annotation (making a correct label for each captured image).

In addition, in the group-specific model generation system 10 of the present embodiment, while the number of clusters, which is the number of the groups of the captured images, is being varied, the value of the BIC (Bayesian information criterion) for each number of clusters is calculated by using the Gaussian Micture Model, and the number of clusters suitable for the distribution of the feature vectors of the captured images extracted by the image feature vector extraction circuitry 34 is obtained on the basis of the value of the calculated BIC corresponding to each number of clusters. As a result, the number of clusters suitable for the distribution of the feature vectors of the captured images can be automatically obtained.

In addition, in the group-specific model generation system 10 of the present embodiment, feature vectors are extracted from each of the captured store images remaining after the captured images in which a person is photographed is removed from the captured images collected from each of the built-in cameras 3 of the signages 2 installed in a plurality of stores, and the captured store images are grouped by using the Gaussian Micture Model, which is unsupervised learning, on the basis of the extracted feature vectors. As described above, the grouping of the captured images on which the grouping of the built-in cameras 3 are based, is performed on the basis of the feature vectors of the captured store images, whereby the grouping of the captured images taken by the built-in cameras 3 can be performed without being affected by persons photographed in the captured images.

MODIFIED EXAMPLES

The present invention is not limited to the configuration of each of the above embodiments, and various modifications are possible within the spirit and scope of the present invention. Next, modified examples of the present invention will be described.

Modified Example 1

In the above embodiments, an example has been described in which the image clustering circuitry 35 groups a group of captured store images by using the Gaussian Micture Model on the basis of the feature vectors of captured images extracted by the image feature vector extraction circuitry 34. However, the model for clustering used for grouping a group of captured images is not limited to the Gaussian Micture Model, and the model only needs to be unsupervised learning such as the k-means method or the expectation maximization (EM) algorithm. In addition, the grouping of the group of captured store images is not necessarily performed on the basis of the feature vector of each captured image as described above, and the group of captured images only needs to be grouped on the basis of various features of each captured image.

Modified Example 2

In the above embodiment, an example has been described in which fine-tuning of the original learned DNN model is performed by using the captured images taken by the built-in cameras 3 in each group and the pseudo labels given to these captured images by the pseudo-labeling circuitry 39, thereby generating the group-specific learned DNN model 20 suitable for the captured images taken by the built-in cameras 3 in each group. However, the group-specific learned DNN model suitable for the captured images taken by the built-in cameras in each of the groups may be generated by performing transfer learning of the original learned DNN model by using the captured images taken by the built-in cameras 3 in the each group and the pseudo labels given to these captured images. Here, the transfer learning means to learn only the weights in a newly added layer while keeping the weights in the original (existing) learned DNN model unchanged.

Modified Example 3

In the above embodiment, an example has been described in which the group-specific learned DNN model 20 suitable for the captured images taken by the built-in cameras 3 in each group is transmitted to and stored in the signages 2 having the built-in cameras 3 of the each group. However, the device that the group-specific learned DNN model is transmitted to and stored (installed) in is not limited to the signage, and may be some edge-side apparatus disposed in a facility such as a store where a camera is installed. Examples of the edge-side apparatus include an image analysis device that performs object detection or object recognition on a captured image taken by a surveillance camera, and include a so-called AI camera.

Modified Example 4

In the above embodiment, while the number of clusters, which is the number of the groups of the captured images, is being varied, the value of the BIC (Bayesian information criterion) for each number of clusters is calculated by using the Gaussian Micture Model, and the number of clusters suitable for the distribution of the feature vectors of the captured images is obtained on the basis of the value of the calculated BIC corresponding to each number of clusters. However, for example, the value of the Akaike's information criterion (AIC) may be calculated for each number of clusters by unsupervised learning such as the Gaussian Micture Model, and the number of clusters suitable for the distribution of the feature vectors of the captured images may be obtained on the basis of the value of the obtained AIC corresponding to each number of clusters.

Modified Example 5

In the above embodiment, since the group-specific learned DNN models 20 generated by the group-specific model generation circuitry 41 are learned DNN models for detection or recognition of a customer, the group-specific learned DNN model 20 suitable for the captured images taken by the built-in cameras 3 in each of the groups is generated by extracting the captured images in which a person is photographed, by using the human image extraction circuitry 38 and by performing fine-tuning on the original learned DNN model by using the extracted captured images in which a person is photographed (each of the captured image groups $B_1$ to $B_k$ of the "captured image groups $B_1$ to $B_k$ in which a person is photographed"). However, for example, in a case where the group-specific learned DNN models generated by the group-specific model generation circuitry are learned DNN models for detecting or recognizing a product or learned DNN models for detecting or recognizing a product shelf, the group-specific learned DNN model suitable for the captured image taken by the above-described built-in camera in each of the groups can be generated by performing fine-tuning of the original (existing) learned DNN model using the "captured image group in which no person is photographed" captured by the built-in camera of each of the k number of groups.

Modified Example 6

In the above embodiment, an example has been described in which the signage learning management server 1 includes the frame image extraction circuitry 32 and the human image removal circuitry 33. However, each signage may have functions corresponding to the frame image extraction circuitry and the human image removal circuitry, and only captured images (frame images) in which no human is photographed may be transmitted to the signage learning management server 1. In this case, the captured image collection circuitry on the signage learning management server side collects the captured images (frame images) in which no person is photographed, from each of the built-in cameras of the signages installed in a plurality of stores.

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. A group-specific model generation system comprising:
a captured image collection circuitry configured to collect a captured image from each of cameras installed in a plurality of facilities;
an image feature extraction circuitry configured to extract a feature from each of the captured images collected by the captured image collection circuitry;
an image clustering circuitry configured to perform grouping of the captured images collected by the captured image collection circuitry, on a basis of the feature of each of the captured images, extracted by the image feature extraction circuitry;
a camera view classification circuitry configured to classify views of the cameras having captured the captured images into groups, on a basis of a result of the grouping of the captured images by the image clustering circuitry; and
a group-specific model generation circuitry configured to generate, by performing fine-tuning or transfer learning of an original learned neural network model for object detection or object recognition for each of the groups by using captured images included in the each of the groups into which the views of the cameras are classified by the camera view classification circuitry, a group-specific learned neural network model dedicated for each of the groups.

2. The group-specific model generation system according to claim 1, further comprising a pseudo-labeling circuitry configured to perform inference on the captured images included in each of the groups by using a learned high-accuracy neural network model for object detection or object recognition with which inference is performed with higher accuracy than with the original learned neural network model for object detection or object recognition, the pseudo-labeling circuitry configured to give, as a correct label, a pseudo label based on a result of the inference to the captured images included in the each of the groups,
wherein the group-specific model generation circuitry performs fine-tuning or transfer learning of the original learned neural network model for object detection or object recognition for each of the groups on a basis of the captured images included in the each of the groups and on a basis of the correct labels given to the captured images included in the each of the groups.

3. The group-specific model generation system according to claim 1, wherein the image clustering circuitry calculates, while varying a number of clusters that is a number of the groups of the captured images, a value of an information criterion for each number of clusters, and obtains a number of clusters suitable for a distribution of the features of the captured images extracted by the image feature extraction circuitry, on a basis of a calculated value of the information criterion corresponding to each number of clusters.

4. The group-specific model generation system according to claim 1, wherein
the image feature extraction circuitry extracts a feature vector from each of the captured images collected by the captured image collection circuitry, by using a learned neural network model, and
the image clustering circuitry groups the captured images collected by the captured image collection circuitry, by using a Gaussian Micture Model on the basis of the feature vector of each of the captured images extracted by the image feature extraction circuitry.

5. The group-specific model generation system according to claim 4, wherein the image clustering circuitry calculates, while varying a number of clusters that is a number of the groups of the captured images, a value of a Bayesian information criterion for each number of clusters, by using a Gaussian Micture Model, and obtains a number of clusters suitable for a distribution of the feature vectors of the captured images extracted by the image feature extraction circuitry, on a basis of a calculated value of the Bayesian information criterion corresponding to each number of clusters.

6. The group-specific model generation system according to claim 1, further comprising a human image removal circuitry configured to remove captured images in which a person is photographed, from the captured images collected by the captured image collection circuitry,
wherein the image feature extraction circuitry extracts a feature from each of captured images of the facilities remaining after the captured images in which a person is photographed are removed by the human image removal circuitry, and
the image clustering circuitry groups the captured images of the facilities on the basis of the feature of each of the captured images of the facilities extracted by the image feature extraction circuitry.

7. The group-specific model generation system according to claim 6, wherein
the original learned neural network model for object detection or object recognition is a learned neural network model for human detection or recognition,
the group-specific model generation system further comprises a human image extraction circuitry that extracts a captured image in which a person is photographed, from the captured images included in each of the groups after classifying by the camera view classification circuitry, and
the group-specific model generation circuitry performs fine-tuning or transfer learning of the learned neural network model for human detection or recognition for the each of the groups by using the captured images, in which a person is photographed and which are extracted by the human image extraction circuitry.

8. A server connected through a network to an edge-side apparatus disposed in each of a plurality of facilities in which cameras are installed, the server comprising:
- a captured image collection circuitry configured to collect a captured image from each of the cameras;
- an image feature extraction circuitry configured to extract a feature from each of the captured images collected by the captured image collection circuitry;
- an image clustering circuitry configured to perform grouping of the captured images collected by the captured image collection circuitry, on a basis of the feature of each of the captured images, extracted by the image feature extraction circuitry;
- a camera view classification circuitry configured to classify views of the cameras having captured the captured images into groups, on a basis of a result of the grouping of the captured images by the image clustering circuitry; and
- a group-specific model generation circuitry configured to generate, by performing fine-tuning or transfer learning of an original learned neural network model for object detection or object recognition for each of the groups by using captured images included in the each of the groups into which the views of the cameras are classified by the camera view classification circuitry, a group-specific learned neural network model dedicated for each of the groups.

9. A non-transitory computer-readable recording medium for recording a group-specific model generation program to cause a computer to execute a process including the steps of:
- collecting a captured image from each of cameras installed in a plurality of facilities;
- extracting a feature from each of the collected captured images;
- grouping the collected captured images on a basis of the extracted feature of each of the captured images;
- classifying views of the cameras having captured the captured images into groups, on a basis of a result of the grouping of the collected captured images; and
- generating, by performing fine-tuning or transfer learning of an original learned neural network model for object detection or object recognition for each of the groups by using captured images included in the each of the groups into which the views of the cameras are classified, a group-specific learned neural network model dedicated for each of the groups.

* * * * *